US012735360B2

(12) United States Patent
Ferrari et al.

(10) Patent No.: US 12,735,360 B2
(45) Date of Patent: Sep. 15, 2026

(54) SYNTHETIC MINERAL COMPOSITION, A METHOD OF FORMING A SYNTHETIC MINERAL COMPOSITION AND USES OF A SYNTHETIC MINERAL COMPOSITION

(71) Applicant: Sibelco Nederland N.V., Maastricht (NL)

(72) Inventors: Francesco Ferrari, Maastricht (NL); Davide Venturelli, Maastricht (NL); Samuel Mark Leese, Maastricht (NL); Monique Alexina Mballa Mballa, Maastricht (NL); Christiaan Willem Mertens, Maastricht (NL); Gerardus Lambertus Creusen, Maastricht (NL)

(73) Assignee: Sibelco Nederland N.V., Maastricht (NL)

( * ) Notice: Subject to any disclaimer, the term of this patent is extended or adjusted under 35 U.S.C. 154(b) by 616 days.

(21) Appl. No.: 18/018,179

(22) PCT Filed: Jul. 23, 2021

(86) PCT No.: PCT/EP2021/070665

§ 371 (c)(1),
(2) Date: Jan. 26, 2023

(87) PCT Pub. No.: WO2022/023198

PCT Pub. Date: Feb. 3, 2022

(65) Prior Publication Data

US 2023/0265017 A1 Aug. 24, 2023

(30) Foreign Application Priority Data

Jul. 30, 2020 (EP) .................................... 20188549

(51) Int. Cl.

| | |
|---|---|
| ***C09D 7/61*** | (2018.01) |
| ***C04B 35/22*** | (2006.01) |
| ***C04B 35/64*** | (2006.01) |
| ***C09D 7/40*** | (2018.01) |
| ***C09D 11/037*** | (2014.01) |

(52) U.S. Cl.

CPC .............. *C04B 35/22* (2013.01); *C04B 35/64* (2013.01); *C09D 7/61* (2018.01); *C09D 7/69* (2018.01); *C09D 11/037* (2013.01); *C04B 2235/321* (2013.01); *C04B 2235/3217* (2013.01); *C04B 2235/3272* (2013.01); *C04B 2235/3418* (2013.01); *C04B 2235/3454* (2013.01); *C04B 2235/3472* (2013.01); *C04B 2235/442* (2013.01); *C04B 2235/6567* (2013.01); *C04B 2235/95* (2013.01); *C04B 2235/9661* (2013.01)

(58) Field of Classification Search

CPC ... C04B 35/22; C04B 35/64; C04B 2235/321; C04B 2235/3217; C04B 2235/3418; C04B 2235/3454; C04B 2235/3472; C04B 2235/442; C04B 2235/6567; C04B 2235/9661; C04B 2111/00767; C04B 2111/00793; C04B 2111/00836; C04B 2111/00853; C04B 2111/00965; C09D 7/61; C09D 7/695; C09D 11/037; C01B 33/12; C08K 3/34

USPC .......................................................... 524/448

See application file for complete search history.

(56) References Cited

U.S. PATENT DOCUMENTS

| | | | |
|---|---|---|---|
| 3,926,647 A | 12/1975 | Wuhrer | |
| 5,356,436 A | 10/1994 | Nonami et al. | |
| 2001/0016550 A1 | 8/2001 | Tomaino et al. | |
| 2015/0266778 A1 | 9/2015 | Riman et al. | |
| 2019/0055133 A1* | 2/2019 | Martin | C01B 33/425 |
| 2020/0031721 A1* | 1/2020 | Yajima | C04B 35/62695 |
| 2020/0123057 A1* | 4/2020 | An | C04B 26/14 |

FOREIGN PATENT DOCUMENTS

| | | |
|---|---|---|
| CN | 1762878 | 4/2006 |
| CN | 102634050 | 8/2012 |
| EP | 1 067 099 | 1/2001 |
| EP | 2 792 654 | 10/2014 |
| GB | 1 296 409 | 11/1972 |
| WO | WO 99/33765 | 7/1999 |

OTHER PUBLICATIONS

Office Action issued for Chinese Application No. 20210058466.5, dated Dec. 31, 2024, 17 pages, with English Translation.
Examination Report for European Application No. 21749572.0, issued Mar. 7, 2024, 5 pages.
International Search Report and Written Opinion issued for International Application No. PCT/EP2021/070665 on Nov. 4, 2021.
Vincenzini ed., "Advances in Ceramics Processing," *Proceedings of the 3rd International Meeting on Modern Ceramics Technologies (3rd CIMTEC)* held in Rimini, Italy from May 27-31, 1977.
Pishch, "Synthesis of diopside-containing pigments," Glass and Ceramics, vol. 38, pp. 143-145, Mar. 1981.
Pishch, "Synthesis of diopside-containing pigments," Chemical Abstracts, 95(8): 276, Aug. 1981.
Chen et al., "New Ceramic Raw Material-Synthetic Diopside," Ceramics, No. 4, pp. 18-22, Aug. 15, 1976.
Yang et al., "Study on Diopside synthesis and its photocatalysis," Journal of Materials and Metallurgy, vol. 9(2), pp. 101-104 and 126, Jun. 30, 2010 (w/ English-language abstract).
Yin et al., "Textbook for Postgraduate Students in the Double-First-Class Construction of Northeastern University: Sorting of Silicate Minerals," Northeastern University Press, p. 173, Dec. 31, 2020.

(Continued)

*Primary Examiner* — Hannah J Pak

(74) *Attorney, Agent, or Firm* — Klarquist Sparkman, LLP

(57) ABSTRACT

The present invention relates to a synthetic mineral composition. The present invention also relates to a method of forming a synthetic mineral composition. The present invention also relates to uses of a synthetic mineral composition.

10 Claims, 2 Drawing Sheets

(56) References Cited

OTHER PUBLICATIONS

Office Action issued for Chinese Patent Application No. 202180058466.5, issued Dec. 6, 2025, 26 pages (English translation).
Examination Report issued in India Application No. 202317009383, dated Jun. 9, 2026, 12 pages.

* cited by examiner

SYNTHETIC MINERAL COMPOSITION, A METHOD OF FORMING A SYNTHETIC MINERAL COMPOSITION AND USES OF A SYNTHETIC MINERAL COMPOSITION

CROSS REFERENCE TO RELATED APPLICATIONS

This is the U.S. National Stage of International Application No. PCT/EP2021/070665, filed Jul. 23, 2021, which was published in English under PCT Article 21(2), which in turn claims the benefit of EP Application No. 20188549.8, filed Jul. 30, 2020; each of these prior applications is incorporated herein by reference in its entirety.

FIELD OF THE INVENTION

The present invention relates to a synthetic mineral composition. The present invention also relates to a method of forming a synthetic mineral composition.

BACKGROUND OF THE INVENTION

Cristobalite is a mineral obtained by calcination of pure silica sand at a temperature of approximately 1550° C.; for example, at a temperature of from 1300° C. to 1700° C.

At room temperature, silica sand is mainly composed of a mineralogical phase called α-quartz. When the α-quartz is heated to approximately 1550° C., the crystalline lattice of the α-quartz undergoes a phase change. Upon heating, α-quartz initially undergoes a phase change to form β-quartz. Upon further heating, β-quartz then forms tridymite and then, at higher temperatures (typically from 1300° C. to 1700° C., at atmospheric pressure), cristobalite is formed.

The different phases of silica at different temperatures and pressures are shown in the phase diagram depicted in FIG. 1.

Cristobalite is chemically stable and mechanically strong. Commercial forms of cristobalite also have a high whiteness. Owing to its ease of manufacture, cristobalite is used in many applications. For example, cristobalite is used in engineering stone (e.g. work surfaces) and in paint.

In the engineering stone market (sometimes referred to as EGS), one of the biggest markets for cristobalite is in the production of kitchen countertops. The countertops are composed of a mineral filler and resin. The countertops typically comprise the mineral filler at a high percentage (up to 92 weight %), whilst one or more resins (optionally: 2K epoxy resins, for example Fugante™ Epoxy 2k; or, polyester resins, for example POLARIS polyester resin (produced by Ashland™)) are present in lower percentages (up to 8 weight %). Cristobalite, quartz, or, cristobalite and quartz, are often incorporated in the countertops as the mineral filler.

Typically, a countertop (composed of a mineral filler and resin) will require cutting prior to installation. A countertop is typically cut in a dry way with simple abrasion tools. This method of cutting the countertop generates dust that is composed of a mixture of the resin and mineral filler. The mineral dust may contain cristobalite, quartz, or, cristobalite and quartz. Cristobalite and quartz dust can lead to work related cell silicosis through inhalation.

Cristobalite, quartz, or cristobalite and quartz, are also used in paint compositions. Paint compositions typically comprise these minerals at from 10 to 20 weight %. Paint can be a source of airborne particles, for example these particles can be generated through spraying or rolling paint, or dry sanding paint. The airborne particles may contain cristobalite, quartz, or, cristobalite and quartz. As discussed above, cristobalite and quartz airborne particles can lead to cell silicosis and lung cancer, through inhalation.

Cristobalite and quartz have been investigated for carcinogenic properties. The carcinogenic properties of the minerals may be enhanced when the minerals are dispersed in the air and then inhaled. Particles of cristobalite and quartz that are respirable are typically sized below 10 μm. Particles of cristobalite and quartz sized below 10 μm can be formed from high energy cutting processes.

There is a need for a safe, alternative mineral filler. U.S. Pat. No. 3,926,647 discloses the production of a synthetic form of the mineral wollastonite and the mineral diopside containing cristobalite and/or quartz up to 7.5 weight %, wherein the maximum purity of the synthetic diopside is 90 weight % pure.

There is a need in at least the EGS and paint markets for a mineral filler to replace cristobalite, quartz, or, cristobalite and quartz; or, reduce cristobalite, quartz, or, cristobalite and quartz to below 1% of the final composition.

SUMMARY OF THE INVENTION

The present invention discloses a synthetic mineral composition which can be used to replace, in whole or in part, cristobalite, quartz, or, cristobalite and quartz.

The present invention relates to a synthetic mineral composition that has the same or similar physical properties as cristobalite.

The present invention is as set out in the following clauses:

1. A synthetic mineral composition, comprising:
   90.5 weight % or more diopside,
   the balance being other minerals and unavoidable impurities.
2. The synthetic mineral composition of clause 1, wherein the composition comprises: 91 weight % or more diopside; or, 91.4 weight % or more diopside; or, 97.5 weight % or more diopside.
3. The synthetic mineral composition of clause 1 or clause 2, wherein the composition further comprises cristobalite, quartz, or cristobalite and quartz, at less than 3.0 weight %, or at less than 2.5 weight %, or at less than 2.0 weight %, or at less than 1.5 weight %, or at less than 1.0 weight %, or at less than 0.5 weight %.
4. The synthetic mineral composition of any one of clauses 1 to 3, wherein the synthetic mineral composition is white or near white in colour.
5. The synthetic mineral composition of any one of clauses 1 to 4, wherein the synthetic mineral composition has the CIELAB colorimetric parameters: from 92 to 100 (L); from −0.3 to +0.3 (a); from +3.5 to +1.5 (b).
6. The synthetic mineral composition of any one of clauses 1 to 5, wherein the CIELAB colorimetric properties are measured on a HunterLab™ Miniscan XE Plus.
7. The synthetic mineral composition of any one of clauses 1 to 6, wherein the synthetic mineral composition comprises less than 0.5 weight % $Fe_2O_3$; or, less than 0.3 weight % $Fe_2O_3$.
8. The synthetic mineral composition of any one of clauses 1 to 7, wherein the synthetic mineral composition comprises less than 5 weight % $Al_2O_3$; or, less than 2 weight % $Al_2O_3$; or, less than 1 weight % $Al_2O_3$; or, less than 0.5 weight % $Al_2O_3$.

9. The synthetic mineral composition of any one of clauses 1 to 8, wherein the synthetic mineral composition has a particle size distribution with a minimum particle size of 100 μm and a maximum particle size of 500 μm (in the form of a grit).
10. The synthetic mineral composition of any one of clauses 1 to 8, wherein the synthetic mineral composition has a particle size distribution with a maximum particle size of 45 μm (in the form of a flour).
11. A synthetic stone comprising the synthetic mineral composition of any one of clauses 1 to 10.
12. The synthetic stone of claim 11, wherein the synthetic stone further comprises a resin.
13. The synthetic stone of claim 11 or claim 12, wherein synthetic stone comprises 80 to 92 weight % synthetic mineral composition and 8 to 20 weight % resin.
14. The synthetic stone of any one of claims 11 to 13, wherein the resin is an epoxy resin, a polyester resin or a polyurethane resin; optionally, wherein the resin is a 2K epoxy resin.
15. The synthetic stone of any one of clauses 11 to 14, wherein the synthetic stone is white or near white in colour.
16. The synthetic stone of any one of clauses 11 to 15, wherein the synthetic stone has the CIELAB colorimetric parameters: from 92 to 100 (L); from −0.3 to +0.3 (a); from +3.5 to +1.5 (b); optionally, wherein the CIELAB colorimetric properties are measured on a HunterLab™ Miniscan XE Plus.
17. A paint composition; or, an ink composition; or, a filtration medium; or, a ceramic composition; or, a dental composition; or, a biomedical composition; or, an implant material; or, a fuel cell; or a nuclear waste immobilization composition; comprising the synthetic mineral composition of any one of clauses 1 to 11.
18. A method of forming a synthetic mineral composition, comprising the following steps:
    providing dolomite, calcium carbonate, quartz and calcined alumina to form a mixture; and,
    heating the mixture to a temperature of from 1200 to 1400° C.
19. The method of clause 18, wherein each starting material is present in the following amounts: dolomite from 30 to 50 weight %; calcium carbonate from 4 to 10 weight %; quartz from 20 to 60 weight %; and, calcined alumina from 1 to 10 weight
20. The method of clause 18 or clause 19, wherein each starting material is present in the following amounts: dolomite 47 weight %±10 weight %; calcium carbonate 7 weight %±10 weight %; quartz 39 weight %±10 weight %; and, calcined alumina 7 weight %±10 weight %.
21. A method of forming a synthetic mineral composition, comprising the following steps:
    providing dolomite, quartz and feldspar (optionally sodium feldspar) to form a mixture; and,
    heating the mixture to a temperature of from 1200 to 1400° C.
22. The method of clause 21, wherein each starting material is present in the following amounts: dolomite from 40 to 80 weight %; quartz from 20 to 60 weight %; and, sodium feldspar ($NaAlSi_3O_8$) from 2 to 6 weight %.
23. The method of clause 21 or clause 22, wherein each starting material is present in the following amounts: dolomite 59 weight %±10 weight %; quartz 37 weight %±10 weight %; and, sodium feldspar ($NaAlSi_3O_8$) 4 weight %±10 weight %.
24. The method of any one of clauses 18 to 24, wherein the heating step occurs for from 50 to 70 minutes; or, from 60 minutes to 600 minutes.
25. A synthetic mineral composition obtained by, or obtainable by, the method of any one of clauses 18 to 24.

BRIEF DESCRIPTION OF THE FIGURES

Embodiments of the invention are described below with reference to the accompanying drawings. The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION OF THE INVENTION

Figure 1:
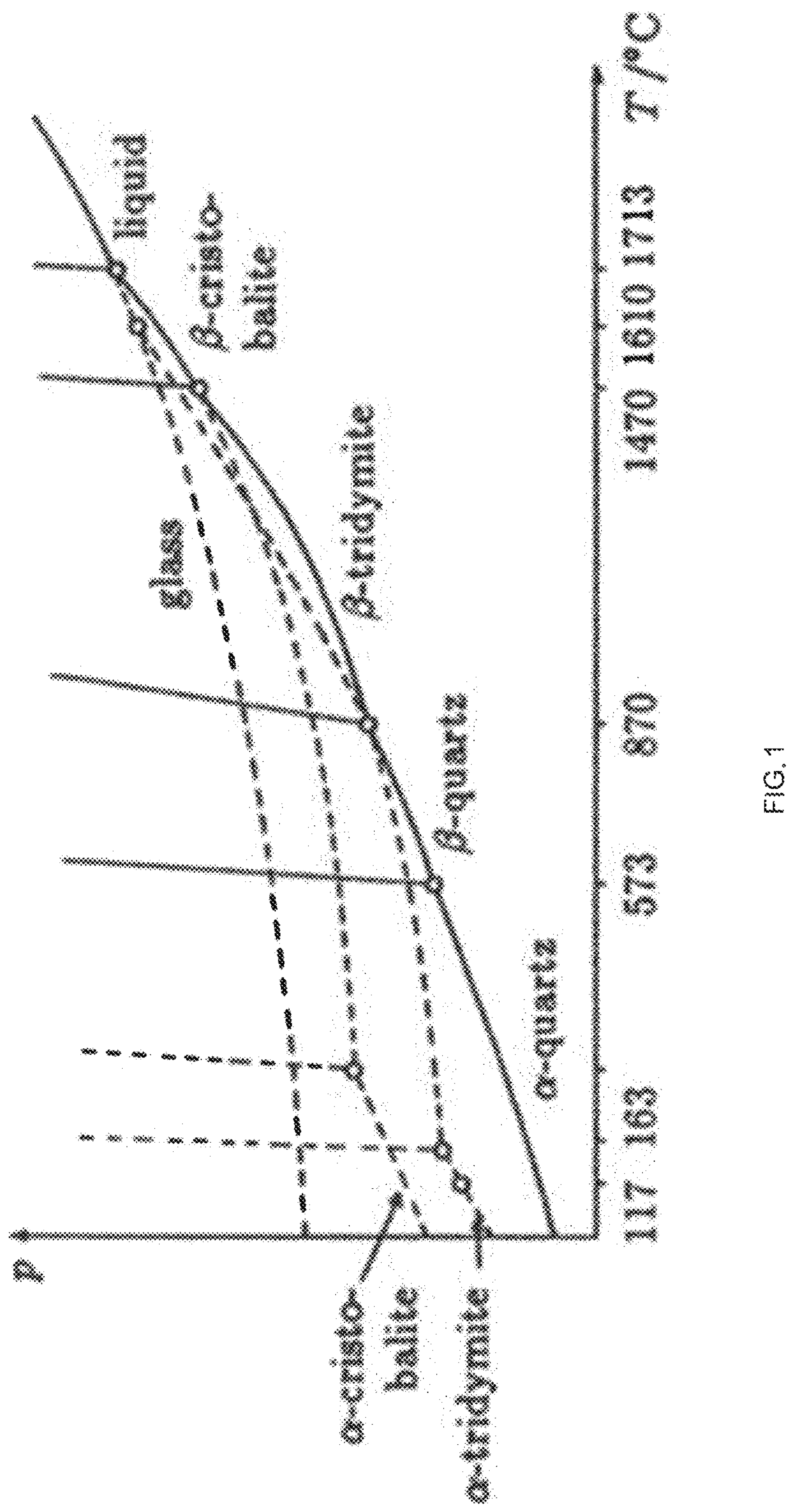
FIG. 1 is a phase diagram of silica at different temperatures and pressures.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Some of the terms used to describe the present invention are set out below:

"Synthetic mineral composition" refers to a mixture of minerals which does not exist in nature.

"Cristobalite" refers to a mineral that is a high-temperature polymorph of quartz. One example of cristobalite is cristobalite grit SIBELITE® M72T (from Sibelco®). Cristobalite grit M72T is industrially produced. Cristobalite grit M72T is commonly used as a starting material for engineering stone and paint applications. Cristobalite grit M72T is referred to as a grit because it has a particle size distribution with a minimum particle size of 100 μm and a maximum particle size of 500 μm. Another example of cristobalite is cristobalite flour SIBELITE® M3000 (from Sibelco®). Cristobalite flour M3000 is referred to as a flour because it has a particle size distribution with a maximum particle size of 45 μm.

"Quartz" refers to a chemical compound consisting of one part silicon to two parts oxygen ($SiO_2$). One example of quartz is quartz M32 (from Sibelco®). Quartz M32 refers to a silica sand which is industrially produced. Quartz M32 is referred to as a quartz sand because it has a particle size distribution with a minimum particle size of 63 μm and a maximum particle size of 1000 μm. The mineral is commonly used as a starting material for the glass, crystal or ceramic industries as a source of silica in foundries, tile glues, plasters, mortars or coatings.

"Dolomite" refers to a mineral with the formula $CaMg(CO_3)_2$. Dolomite D-120 (from Sibelco®) refers to an anhydrous carbonate mineral composed of calcium magnesium carbonate. Dolomite D-120 is industrially produced.

"Diopside" refers to a mineral with the formula $MgCaSi_2O_6$. Naturally occurring diopside typically forms a solid solution series with hedenbergite ($CaFeSi_2O_6$). Therefore, naturally occurring diopside can incorporate Fe in its structure (Fe replacing Mg) and still be considered diopside until a threshold of approximately 14 weight % $Fe_2O_3$. Naturally occurring diopside is a rare mineral that occurs in two distinct geological settings: (1) in types of ultrabasic rocks, such as kimberlite; and, (2) in a setting of contact metamorphism often associated with wollastonite. In these geological settings, limited to a few percent of the continental earth crust, diopside crystals can commonly be found in micro or macro crystal shape. The occurrence of a concentration of naturally occurring diopside in (mineable) veins, or masses (thousands of cubic meters close to surface) is extremely rare. The occurrence of large masses of rock (tens or hundreds of thousands of cubic meters) with a percentage of diopside more than 10% are rare as well. In such large masses, often dominated by wollastonite, diopside can be concentrated after crushing to a fine sand size with conventional mineral processing techniques (such as flotation) depending of the value of the associated rock composition.

"Calcined alumina" refers to a commercial form of alumina ($Al_2O_3$). Calcined alumina SO-143, supplied by DADCO Alumina & Chemicals Ltd, is formed by firing alumina at temperatures around 1,000° C., for example at temperatures from 900° C. to 1,100° C.

"Feldspar" refers to a group of minerals with the formulae $KAlSi_3O_8$, $NaAlSi_3O_8$ and $CaAl_2Si_2O_8$. One example of feldspar is sodium feldspar; sodium feldspar includes Albite and has the formula $NaAlSi_3O_8$. MAXUM® 1005-K was a sodium feldspar produced and sold by Sibelco® until the product name changed. The sodium feldspar previously sold by Sibelco® under the trade mark MAXUM® 1005-K is now sold by Sibelco® under the name Sodium Feldspar 1005.

"CIELAB colour space" refers to colour space defined by the International Commission on Illumination. It expresses colour as three numerical values: L (lightness); a (green-red colour components); and, b (blue-yellow components).

"White" refers to a colour expressed using CIELAB colour space coordinates. White has the parameters: 100 (L), 0 (a), 0 (b).

"Near white" refers to a colour expressed using CIELAB colour space coordinates. Near white has the CIELAB colour space coordinates from 90 to below 100 (L), from −0.5 to +0.5 (a), from 0 to 4 (b).

"LOI" refers to loss on ignition. This measurement is conducted by strongly heating a sample of the mineral at a specified temperature and allowing any volatile substances to escape. This will continue until the mass of the mineral stops changing. The value of LOI represents the mass of moisture and volatile material present in a sample.

"Weight %" refers to the percentage weight in grams of a component of a composition in every 100 grams of a composition. For example, if a mineral composition contains diopside at 25 weight %, then there is 25 g of diopside for every 100 g of the mineral composition.

"Unavoidable impurities" refers to components present in a composition which do not affect the properties of the composition. Unavoidable impurities are present in a composition at: less than 5 weight %; or, less than 4 weight %; or, less than 3 weight %; or, less than 2 weight %; or, less than 1 weight %; or less than 0.5 weight %; or less than 0.1 weight %.

Formation of Synthetic Mineral Composition 1 (SMC1)

In one example of the present invention, SMC1 is formed from quartz, calcium carbonate, dolomite and calcined alumina.

In this example of the present invention, the quartz is provided at 39 weight %. In other examples, the quartz is provided at from 20 to 60 weight %. In this example of the present invention, the quartz is provided at 98 weight % pure. In other examples, the quartz is provided at from 96 to 100 weight % pure.

In this example of the present invention, the calcium carbonate is provided at 7 weight %. In other examples, the calcium carbonate is provided at from 4 to 10 weight %. In this example of the present invention, the calcium carbonate is provided at 96 weight % pure. In other examples, the calcium carbonate is provided at from 92 to 100 weight % pure.

In this example of the present invention, the dolomite is provided at 47 weight %. In other examples, the dolomite is provided at from 30 to 50 weight %. In this example of the present invention, the dolomite is provided at 96 weight % pure. In other examples, the dolomite is provided at from 92 to 100 weight % pure.

In this example of the present invention, the calcined alumina is provided at 7 weight %. In other examples, the calcined alumina is provided at from 1 to 10 weight %. In this example of the present invention, the calcined alumina is provided at 95 weight % pure. In other examples, the calcined alumina is provided at from 90 to 100 weight % pure.

In this example of the present invention, the starting materials for SMC1 include quartz (as described above), calcium carbonate (as described above), dolomite (as described above), calcined alumina (as described above), and, optionally water and/or alumina balls.

In this example, the starting materials for SMC1 were provided as follows: 175.5 g quartz (quartz M32), 31.5 g calcium carbonate (calcite), 211.5 g dolomite (dolomite D-120) and 31.5 g calcined alumina. In other examples, the starting materials for SMC1 may be present at from 150 to 215 g quartz, 5 to 55 g calcium carbonate, 185 to 225 g dolomite and 5 to 40 g calcined alumina.

In this example, the starting materials were milled together using an alumina jar containing 400 g of water and 450 g of alumina balls (the alumina balls each having a diameter of from 20 to 25 mm) for 60 minutes. In other examples, the time of milling the starting materials of SMC1 may be: from 20 to 180 minutes; or, from 40 minutes to 90 minutes; or 60 minutes plus or minus 10%.

The starting materials were dried after milling. In this example, the temperature at which the starting materials were dried is 110° C. The temperature at which the starting materials are dried may be less than 110° C., for example from 90 to 100° C., or for example from 100 to 110° C. The temperature at which the starting materials are dried may be greater than 110° C., for example from 110 to 120° C., or for example from 120 to 130° C.

In this example, the starting materials were dried for 12 hours. The starting materials may be dried for less than 12 hours, for example for 6 to 8 hours, or 8 to 10 hours, or for 10 to 12 hours. The starting materials may be dried for longer than 12 hours, for example for 12 to 14 hours, or 14 to 16 hours, or for 16 to 18 hours.

In this example, the starting materials were pulverised. Typically, pulverisation occurs after the starting materials have been dried. Pulverisation can occur in a pestle and mortar. Pulverisation may require a sieve. The sieve may have a mesh size of 1 mm. The sieve may have a mesh size less than 1 mm, for example, from 0.1 mm to 1 mm, or from 0.01 mm to 0.1 mm, or from 0.001 mm to 0.01 mm.

In this example, SMC1 is formed by calcination. SMC1 may be calcined in a kiln. Typically, the starting materials are calcined after pulverisation.

Optionally, the calcination can be performed using a Nannetti Kiln.

Optionally, the calcination can be performed using an alumina crucible. Further optionally, the crucible can have a diameter of 12 cm, height of 9 cm and a thickness of 1 cm. Optionally, 50 g of the starting materials are placed in the alumina crucible prior to calcination.

In this example, the calcination is performed at a high temperature. The temperature required to produce SMC1 is from 1220° C. to 1350° C. The temperature required to produce SMC1 may be from 1230° C. to 1270° C.

In this example, the time of calcination at from 1220° C. to 1350° C. (optionally at from 1230° C. to 1270° C.) is 60 minutes. The time of calcination at 1220° C. to 1350° C. (optionally at from 1230° C. to 1270° C.) may be shorter than 60 minutes, for example from 20 minutes to 60 minutes, or from 40 minutes to 60 minutes. The time of calcination at 1220° C. to 1350° C. (optionally at from 1230° C. to 1270° C.) may be longer than 60 minutes, for example from 60 minutes to 180 minutes, or 60 minutes to 150 minutes, or 60 minutes to 130 minutes, or 60 minutes to 90 minutes.

In this example, the SMC1 formed following calcination is composed of a mixture of minerals. SMC1 comprises diopside. Diopside is the main component of SMC1; for example, at 97.5 weight %. In other examples, diopside may be present at 90 weight %, or more.

In this example, SMC1 may comprise unavoidable impurities. The unavoidable impurities of SMC1 may comprise quartz and amorphous glass. The unavoidable impurities of SMC1 may be present, for example, at 2.5 weight %. In other examples the unavoidable impurities of SMC1 may be present at 10 weight %, or less.

In this example, the unavoidable impurities of SMC1 may comprise quartz at 1.2 weight % and amorphous glass at 1.3 weight %.

Respirable particles of SMC1 mitigate or eliminate carcinogenic effects when compared to respirable particles of other minerals, for examples quartz and cristobalite. SMC1 is white or near white in colour. SMC1 has the same or similar chemical resistance and mechanical properties as cristobalite.

SMC1 may be used in applications outside of engineering stone and paint. SMC1 may be used in ceramic compositions as a whitening agent, as a coefficient of expansion modifier or as a linear shrinkage reducer. SMC1 may be used in ink compositions. SMC1 may replace zirconium silicate and alumina in some ceramics applications. Alternatively, SMC1 may be used as a filtration media. SMC1 may be used for dental and biomedical applications; as an implant material SMC1 may be used as a biomaterial coating for preventing implant-related infections due to its anti-bacterial activity. SMC1 has potential application in fuel cell technology. SMC1 has potential application in nuclear waste immobilization.

Formation of Synthetic Mineral Composition 2 (SMC2)

In one example of the present invention, SMC2 is formed from quartz, dolomite and sodium feldspar.

In this example of the present invention, the quartz is provided at 37 weight %. In other examples, the quartz is provided at from 20 to 60 weight %. In other examples, the quartz is provided at from 35 to 39 weight %. In this example of the present invention, the quartz is provided at 98 weight % pure. In other examples, the quartz is provided at from 96 to 100 weight % pure.

In this example of the present invention, the dolomite is provided at 59 weight %. In other examples, the dolomite is provided at from 40 to 80 weight %. In other examples, the dolomite is provided at from 55 to 63 weight %. In this example of the present invention, the dolomite is provided at 96 weight % pure. In other examples, the dolomite is provided at from 92 to 100 weight % pure.

In this example of the present invention, the sodium feldspar ($NaAlSi_3O_8$) is provided at 4 weight %. In other examples, the sodium feldspar ($NaAlSi_3O_8$) is provided at from 1 to 7 weight %. In other examples, the sodium feldspar is provided at from 2 to 6 weight %. In this example of the present invention, the sodium feldspar ($NaAlSi_3O_8$) is provided at 88 weight % pure. In other examples, the sodium feldspar is provided at from 80 to 96 weight % pure.

In this example of the present invention, the starting materials for SMC2 include quartz (as described above), dolomite (as described above), sodium feldspar (as described above), and, optionally water and/or alumina balls.

In this example, the starting materials for SMC2 were provided as follows: 166.5 g quartz (quartz M32), 18 g sodium feldspar (MAXUM® 1005-K (now named Sodium Feldspar 1005); $NaAlSi_3O_8$), 265.5 g dolomite (dolomite D-120). In other examples, the starting materials for SMC2 may be present at from 157.5 to 175.5 g quartz, 9 to 25 g of sodium feldspar (MAXUM® 1005-K (now named Sodium Feldspar 1005); $NaAlSi_3O_8$), 247.5 g to 283.5 dolomite and 5 to 25 g calcined alumina.

In this example, the starting materials were wet milled together using an alumina jar containing 400 g of water and 450 g of alumina balls as grinding media (the alumina balls each having a diameter of from 20 to 25 mm) for 60 minutes. In other examples, the time of milling the starting materials of SMC2 may be: from 20 to 180 minutes; or, from 40 minutes to 90 minutes; or 60 minutes plus or minus 10%.

The starting materials were dried after milling. In this example, the temperature at which the starting materials were dried is 110° C. The temperature at which the starting materials are dried may be less than 110° C., for example from 90 to 100° C., or for example from 100 to 110° C. The temperature at which the starting materials are dried may be greater than 110° C., for example from 110 to 120° C., or for example from 120 to 130° C.

In this example, the starting materials were dried for 12 hours. The starting materials may be dried for less than 12 hours, for example for 6 to 8 hours, or 8 to 10 hours, or for 10 to 12 hours. The starting materials may be dried for longer than 12 hours, for example for 12 to 14 hours, or 14 to 16 hours, or for 16 to 18 hours.

In this example, the starting materials were pulverised. Typically, pulverisation occurs after the starting materials have been dried. Pulverisation can occur in a pestle and mortar. Pulverisation may require a sieve. The sieve may have a mesh size of 1 mm. The sieve may have a mesh size less than 1 mm, for example, from 0.1 mm to 1 mm, or from 0.01 mm to 0.1 mm, or from 0.001 mm to 0.01 mm.

In this example, SMC2 is formed by calcination. SMC2 may be calcined in a kiln. Typically, the starting materials are calcined after pulverisation.

Optionally, the calcination can be performed using a Nannetti Kiln.

Optionally, the calcination can be performed using an alumina crucible. Further optionally, the crucible can have a diameter of 12 cm, height of 9 cm and a thickness of 1 cm. Optionally, 50 g of the starting materials are placed in the alumina crucible prior to calcination.

In this example, the calcination is performed at a high temperature. The temperature required to produce SMC2 is from 1220° C. to 1350° C. The temperature required to produce SMC2 may be at 1270° C.

In this example, the time of calcination at from 1220° C. to 1350° C. (optionally at 1270° C.) is 60 minutes. The time of calcination at 1220° C. to 1350° C. (optionally at 1270° C.) may be shorter than 60 minutes, for example from 20 minutes to 60 minutes, or 40 minutes to 60 minutes. The time of calcination at 1220° C. to 1350° C. (optionally at 1270° C.) may be longer than 60 minutes, for example from 60 minutes to 180 minutes, or 60 minutes to 150 minutes, or 60 minutes to 60 minutes, or 60 minutes to 90 minutes.

In this example, SMC2 formed following calcination is composed of a mixture of minerals. SMC2 comprises diopside. Diopside is the main component of SMC2; for example, at 91.4 weight %. In other examples diopside may be present at 70 weight %, or 75 weight %, or 80 weight %, or 85 weight %, or 90 weight %, or more.

In this example, SMC2 may additionally comprise quartz, cristobalite, melilite and amorphous glass. The additional components of SMC2 may be present, for example, at 8.6 weight %. In other examples the additional components may be present at 30 weight %, or 25 weight %, or 20 weight %, or 15 weight %, or 10 weight %, or less.

SMC2 mitigates carcinogenic effects when compared to other minerals, for examples quartz and cristobalite. SMC2 is white or near white in colour. SMC2 has the same of similar chemical resistance and mechanical properties as cristobalite.

SMC2 may be used in applications outside of engineering stone and paint. SMC2 may be used in ceramic compositions as a whitening agent, as a coefficient of expansion modifier or as a linear shrinkage reducer. SMC2 may be used in ink compositions. SMC2 may replace zirconium silicate and alumina in some ceramics applications. Alternatively, SMC2 may be used as a filtration media. SMC2 may be used for dental and biomedical applications; as an implant material SMC2 may be used as a biomaterial coating for preventing implant-related infections due to its anti-bacterial activity. SMC2 has potential application in fuel cell technology. SMC2 has potential application in nuclear waste immobilization.

EXAMPLES

The following are non-limiting examples that discuss, with reference to tables and figures, the advantages of the synthetic mineral compositions of the present invention.

Example 1: Formation of Synthetic Mineral Composition 1 (SMC1)

The following non-limiting example discusses the preparation of SMC1 according to the presently claimed invention.

In this non-limiting example, SMC1 was formed from four starting materials, namely, quartz M32 or cristobalite M72T, calcium carbonate, dolomite D-120 and calcined alumina SO-143. The starting materials obtained from Sibelco® were quartz M32, cristobalite M72T and dolomite D-120. Calcium carbonate was sourced from Gimat™ S.r.l. and calcined alumina was sourced from DADCO™ Alumina & Chemicals Ltd.

In this example, SMC1 was formed according to a method comprising the steps of:

1. Chemical analysis of the starting materials;
2. Mineralogical analysis of the starting materials;
3. Determination of the weight composition of the starting materials before calcination;
4. Preparation and mixing of the starting materials;
5. Calcination;
6. Calcined SMC1 characterisation.

Each step is discussed in more detail:

Step 1. Chemical Analysis of the Starting Materials

The chemical composition of the starting materials used to make SMC1 was analysed by applying x-ray fluorescence techniques.

In addition, the LOI of each starting material was analysed on a laboratory muffle furnace. The furnace was heated by 10° C. every minute until 1000° C. was reached. The end environment was maintained for 30 minutes.

Table 1 outlines the results from the chemical composition and LOI analysis.

TABLE 1

The chemical composition and LOI of the starting materials of SMC1.

| Starting | Chemical Composition (Weight %) | | | | | | | | |
|---|---|---|---|---|---|---|---|---|---|
| material | $SiO_2$ | $Al_2O_3$ | $TiO_2$ | $Fe_2O_3$ | CaO | MgO | $Na_2O$ | $K_2O$ | LOI |
| Quartz M32 | 98.50 | 0.80 | 0.04 | 0.06 | 0.06 | 0.06 | 0.01 | 0.20 | 0.00 |
| Calcium carbonate | 0.60 | 0.01 | 0.06 | 0.09 | 59.64 | 0.01 | 0.01 | 0.10 | 39.48 |
| Dolomite D-120 | 0.50 | 0.02 | 0.00 | 0.03 | 30.41 | 21.90 | 0.00 | 0.00 | 47.14 |
| Calcined alumina | 0.08 | 98.50 | 0.002 | 0.014 | 0.006 | 0.00 | 0.32 | 0.00 | 1.00 |

With reference to Table 1, the most common chemical in the quartz M32 or cristobalite M72T used to make SMC1 is $SiO_2$ (98.5 weight %). With reference to Table 1, the most common chemical in the calcium carbonate used to make SMC1 is CaO (59.64 weight %); with 39.48 LOI. With reference to Table 1, the most common chemical in the dolomite D-120 used to make SMC1 is CaO (30.41 weight %), and then MgO (21.90 weight %); with 47.14 LOI. With reference to Table 1, the most common chemical in the calcined alumina used in example 1 is $Al_2O_3$(98.50 weight %).

Step 2. Mineralogical Analysis of the Starting Materials

The mineralogy of the starting materials used to make SMC1 was analysed by applying X-ray diffraction techniques. Table 2 shows the purity of the four minerals as a percentage of total weight.

TABLE 2

The mineralogy of the four minerals used to form SMC1.

| | Mineral present | XRD Analysis (Weight %) |
|---|---|---|
| Dolomite (D-120) | Dolomite | 96 |
| | Other | 4 |
| Calcium carbonate | Calcite | 96 |
| | Other | 4 |
| Quartz (M32) | Quartz | 98 |
| | Other | 2 |
| Calcined alumina | Alfa Alumina | 95 |
| | Other | 5 |

With reference to Table 2, quartz M32 has a purity of 98 weight %. With reference to Table 2, dolomite D-120 and calcium carbonate have a purity of 96 weight %. With reference to Table 2, calcined alumina has a purity of 95 weight %. All four starting materials used in example 1 have a purity of 95 weight % or greater.

Step 3. Weight Composition of SMC1 Before Firing

Table 3 shows the composition of SMC1 before firing.

During the firing process the composition changes due to the processing conditions, i.e. chemical and structural changes occur during heating.

TABLE 3

Composition of SMC1.

| Starting material | Weight % |
|---|---|
| Quartz (M32) | 39 |
| Calcium carbonate | 7 |
| Dolomite (D-120) | 47 |
| Calcined alumina | 7 |

With reference to Table 3, example 1 requires dolomite D-120 and quartz M32 to be the main starting material components of SMC1 at 41 weight % and 39 weight % respectively. The composition also includes calcium carbonate at 7 weight % and calcined alumina at 3 weight %.

Step 4. Preparation and Mixing of the Starting Materials

The starting materials (described in step 3) were weighed on an ORMA Technology Balance. Quartz M32 (175.5 g), calcium carbonate (31.5 g), dolomite D-120 (211.5 g) and calcined alumina (31.5 g) were weighed and put inside an alumina jar. The capacity of the alumina jar was 1 litre.

Alumina balls with a diameter of 20 to 25 mm (450 g) and water (400 g) were added to the alumina jar in addition to the starting materials respectively as a grinding corpse and grinding vehicle.

The alumina jar and its contents were placed inside a Nannetti S.r.l. Laboratory SPEEDY discontinuous fast mill for 60 minutes.

The density of the slurry formed in the alumina jar was determined on a pycnometer (known volume of 100 ml and weight of 200 g). The density of the particles was determined to be approximately 1550 g $dm^{-3}$.

The size of the particles formed by milling was determined by a MALVERN Mastersizer 2000 Laser Granulometer. Table 4 shows the size of the particles (μm) versus the volume (volume %) of the milling product's particles. The data is further shown in graph form in FIG. 2.

TABLE 4

Size of the particles (μm) versus the volume (volume %) of the particles formed in the milling process.

| Size (μm) | Volume (Vol. %) |
|---|---|
| 0.01-0.316 | 0.00 |
| 0.363 | 0.05 |
| 0.417 | 0.26 |
| 0.479 | 0.45 |
| 0.550 | 0.66 |
| 0.631 | 0.87 |
| 0.724 | 1.08 |
| 0.832 | 1.29 |
| 0.955 | 1.49 |
| 1.096 | 1.69 |
| 1.259 | 1.87 |
| 1.445 | 2.04 |
| 1.660 | 2.20 |
| 1.905 | 2.35 |
| 2.188 | 2.49 |
| 2.512 | 2.61 |
| 2.884 | 2.73 |
| 3.311 | 2.85 |
| 3.802 | 2.96 |
| 4.365 | 3.06 |
| 5.012 | 3.16 |

TABLE 4-continued

Size of the particles (μm) versus the volume (volume %) of the particles formed in the milling process.

| Size (μm) | Volume (Vol. %) |
|---|---|
| 5.754 | 3.26 |
| 6.607 | 3.38 |
| 7.586 | 3.54 |
| 8.710 | 3.76 |
| 10.000 | 4.02 |
| 11.482 | 4.30 |
| 13.183 | 4.56 |
| 15.136 | 4.75 |
| 17.378 | 4.83 |
| 19.953 | 4.77 |
| 22.909 | 4.55 |
| 26.303 | 4.17 |
| 30.200 | 3.66 |
| 34.674 | 3.06 |
| 39.811 | 2.43 |
| 45.709 | 1.82 |
| 52.481 | 1.27 |
| 60.256 | 0.82 |
| 69.183 | 0.48 |
| 79.433 | 0.26 |
| 91.201 | 0.10 |
| 104.713 | 0.03 |
| 120.226-10000.000 | 0.00 |

Figure 2:
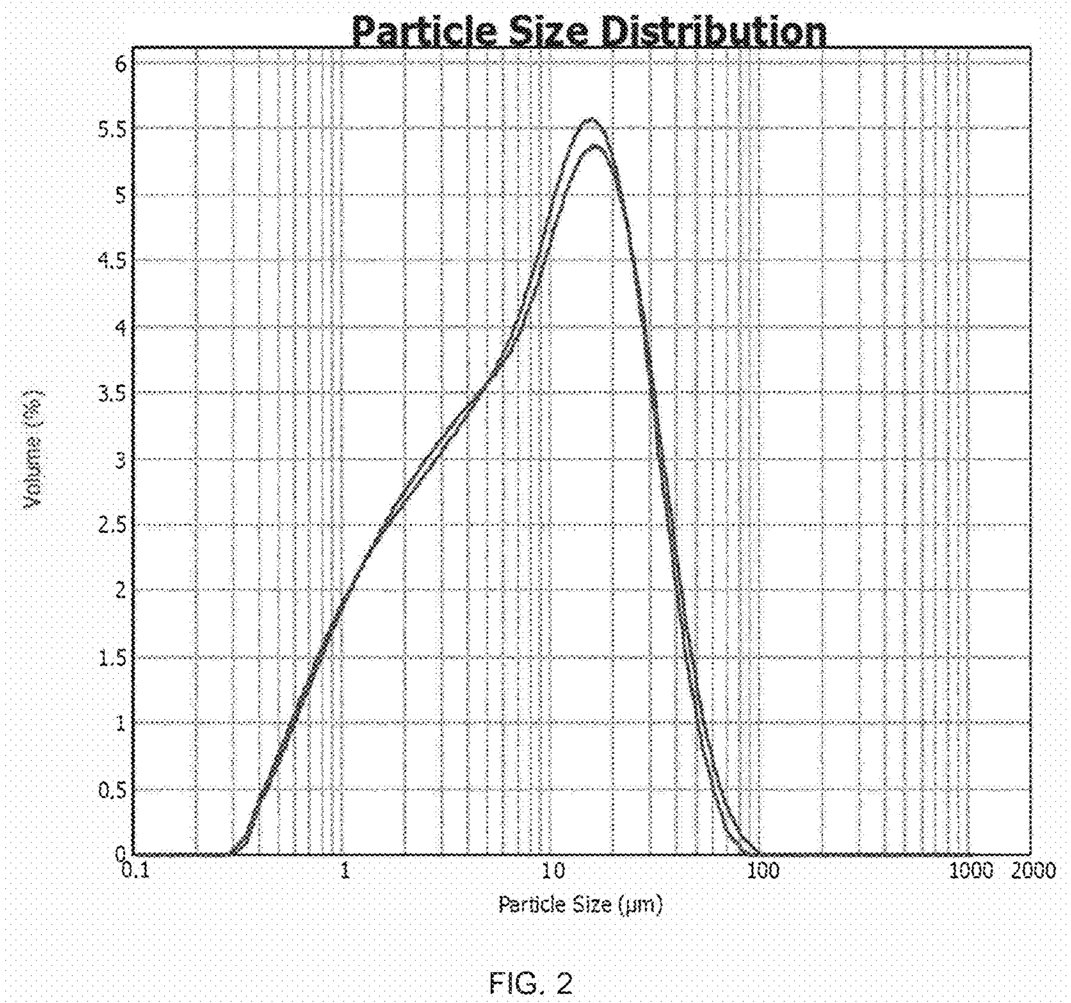
FIG. 2 is a graph showing the size of the particles (μm) versus the volume (volume %) of the particles formed in a milling process.

With reference to Table 4 and FIG. 2, the size of the particles in the milling product range from 0.363 to 104.713 μm. In particular, the majority of particles in the milling product have a particle size ranging from 10.000 to 26.303 μm. With reference to Table 4, the most common particle size of the milling product is 17.378 μm.

The milling product was then dried in a Nannetti Fast Dryer at 110° C. for 12 hours. A powder was formed.

The powder was subsequently pulverised using an alumina mortar and pestle. The powder was then sieved using a sieve with a 1 mm mesh. The sieving step ensured that any erroneously large particles were not present in the slurry.

The conditions required to form the powder were set for a laboratory experiment. In other examples, the conditions may change for an industrial scale method.

Step 5. Calcination

Calcination of SMC1 was conducted on a Nannetti Kiln. This kiln was able to reach temperatures of up to 1400° C., if required.

In example 1, calcination was conducted at a maximum temperature of 1270° C. in the Nannetti Kiln.

The powder from step 4 was placed in the kiln in an alumina crucible. The crucible's dimensions were 12 cm in diameter, 9 cm in height and 1 cm in thickness.

In this non-limiting example, 50 grams of the powder from step 4 was calcined to form SMC1.

In this non-limiting example, the crucible was filled with the milling product and placed inside the chamber of the Nannetti Kiln. The temperature was increased 10° C. every minute until a maximum temperature of 1270° C. was reached. This maximum temperature of the kiln was maintained for a period of 60 minutes.

At the end of the 60 minutes, the crucible was removed from the kiln and permitted to cool to room temperature.

The conditions required to form SMC1 in the kiln were set for a laboratory experiment. In other examples, the calcination conditions may change for an industrial scale method.

Step 6. SMC1 Characterisation

SMC1 formed from Step 5 was characterised. Additionally, the colorimetric properties of SMC1 were determined.

The chemical composition of SMC1 was determined by XRF (X-ray fluorescence) analysis. The results are shown in Table 5.

TABLE 5

The chemical composition of SMC1 after calcination.

| Chemical | Weight % |
|---|---|
| $SiO_2$ | 39.13 |
| $Al_2O_3$ | 8.22 |
| $TiO_2$ | 0.01 |
| $Fe_2O_3$ | 0.02 |
| CaO | 18.36 |
| MgO | 10.61 |
| $Na_2O$ | 0.00 |
| $K_2O$ | 0.02 |
| Other chemicals and unavoidable impurities | 23.63 |

With reference to Table 5, the most common chemical in SMC1 is $SiO_2$.

The mineral composition of SMC1 after calcination was determined by XRD analysis and is shown in Table 6.

TABLE 6

The mineralogy of SMC1 after calcination.

| Mineral | Weight % |
|---|---|
| Quartz | 0.0 |
| Cristobalite | 0.0 |
| Wollastonite | 0.0 |
| Pseudowollastonite | 0.0 |
| Diopside | 97.5 |
| Plagioclase (Anorthite) | 0.0 |
| Periclase | 0.0 |
| Melilite | 0.0 |
| Monticellite | 0.0 |
| Merwinite | 0.0 |
| Grossite | 0.0 |
| Spinel | 0.0 |
| Other minerals and unavoidable impurities | 2.5 |

With reference to Table 6, the most common mineral in SMC1 is diopside.

Colorimetric properties of SMC1 were measured. The results are shown in Table 7. Table 7 compares the colorimetric properties of SMC1 flour with the colorimetric parameters of cristobalite M3000 (a flour which is used commercially as a mineral filler to form countertops composed of a mineral filler and resin).

The parameters in Table 7 are defined by CIELAB. The parameter "b" is important when assessing colour. The higher the parameter "b" is, the more yellow the material is. To determine the colour of SMC1, colour-colorimetric and spherical coordinates were used with a set light of D65/10°. The measurement was done using a colorimeter, the model being a HunterLab™ Miniscan XE Plus.

TABLE 7

Colorimetric parameters of SMC1 (in flour form, because it had a particle size distribution with a maximum particle size of 45 μm) compared to cristobalite flour M3000.

| Parameter | SMC1 Flour | Cristobalite flour M3000 |
|---|---|---|
| L | 96.80 | 96.73 |
| a | −0.03 | −0.05 |
| b | 0.48 | 0.70 |

With reference to Table 7, SMC1 has comparable colorimetric properties to cristobalite flour. Furthermore, quartz and cristobalite are not present in SMC1 (see Table 6). Therefore, SMC1 minimises carcinogenic activity (by minimising the presence of quartz and cristobalite) whilst at the same time giving similar or better colorimetric properties to cristobalite flour M3000.

Step 7: Determination of the Purity of SMC1

As determined in the mineralogy analysis of SMC1, the most common mineral in SMC1 is diopside (see Table 6).

Previously, the purity of diopside in a synthetic mineral composition did not exceed 84%. However, the purity of diopside in SMC1 is 97.5%.

Natural diopside comprises iron at from 0.5 to 2.5 weight %, or higher. SMC1 comprises iron at 0.02 weight %. The lower iron content results in improved colorimetrical parameters, and an improved degree of whiteness.

Example 2: Formation of Synthetic Mineral Composition 2 (SMC2)

The following non-limiting example discusses the preparation of SMC2 according to the presently claimed invention.

In this non-limiting example, SMC2 was formed from three starting materials, namely, quartz M32 or cristobalite M72T, dolomite D-120 and sodium feldspar (MAXUM® 1005-K (now named Sodium Feldspar 1005)). The starting materials obtained from Sibelco® were quartz M32, cristobalite M72T and dolomite D-120. MAXUM® 1005-K sodium feldspar, now named Sodium Feldspar 1005, is a sodium feldspar produced by Sibelco®.

In this example, SMC2 was formed according to a method comprising the steps of:

1. Chemical analysis of the starting materials;
2. Mineralogical analysis of the starting materials;
3. Determination of the weight composition of the starting materials before calcination;
4. Preparation and mixing of the starting materials;
5. Calcination;
6. Calcined SMC2 characterisation;
7. Determination of the purity of SMC2.

Each step is discussed in more detail:

Step 1. Chemical Analysis of the Starting Materials

The chemical composition of the starting materials used to make SMC2 was analysed by applying x-ray fluorescence techniques.

In addition, the LOI of each starting material was analysed on a laboratory muffle furnace. The furnace was heated by 10° C. every minute until 1000° C. was reached. The end environment was maintained for 30 minutes.

Table 8 outlines the results from the chemical composition and LOI analysis.

TABLE 8

The chemical composition and LOI of the starting materials of SMC2.

| Starting material | Chemical Composition (Weight %) | | | | | | | | |
|---|---|---|---|---|---|---|---|---|---|
| | $SiO_2$ | $Al_2O_3$ | $TiO_2$ | $Fe_2O_3$ | CaO | MgO | $Na_2O$ | $K_2O$ | LOI |
| Quartz M32 | 98.50 | 0.80 | 0.04 | 0.06 | 0.06 | 0.06 | 0.01 | 0.20 | 0.00 |
| Dolomite D-120 | 0.50 | 0.02 | 0.00 | 0.03 | 30.41 | 21.90 | 0.00 | 0.00 | 47.14 |
| Feldspar MAXUM ® 1005-K | 68.82 | 19.25 | 0.03 | 0.03 | 1.16 | 0.00 | 10.30 | 0.24 | 0.16 |

Sodium feldspar MAXUM® 1005-K is now named Sodium Feldspar 1005.

With reference to Table 8, the most common chemical in the quartz M32 or cristobalite M72T used to form SMC2 is $SiO_2$ (98.5 weight %). With reference to Table 8, the most common chemical in the dolomite D-120 used to form SMC2 is CaO (30.41 weight %), and then MgO (21.90 weight %); with 47.14 LOI. With reference to Table 8, the most common chemical in the sodium feldspar (MAXUM® 1005-K (now named Sodium Feldspar 1005)) used to form SMC2 is $SiO_2$ (68.82 weight %), and then $Al_2O_3$ (19.25 weight %).

Step 2. Mineralogical Analysis of the Starting Materials

The mineralogy of the starting materials used to make SMC2 was analysed by applying X-ray diffraction techniques. Table 9 shows the purity of the three minerals as a percentage of total weight.

TABLE 9

The mineralogy of the three minerals used to form SMC2.

| | Mineral present | XRD Analysis (Weight %) |
|---|---|---|
| Dolomite (D-120) | Dolomite | 96 |
| | Other | 4 |
| Quartz (M32) | Quartz | 98 |
| | Other | 2 |
| Sodium Feldspar (MAXUM ® 1005-K) | Albite | 88 |
| | Quartz | 12 |

Sodium feldspar MAXUM® 1005-K is now named Sodium Feldspar 1005.

With reference to Table 9, quartz M32 has a purity of 98%. With reference to Table 9, dolomite D-120 has a purity of 96%. With reference to Table 9, sodium feldspar has a purity of 88%. All three starting materials used have a purity of 88% or greater.

Cristobalite grit M72T has the same chemical composition as quartz M32. Therefore, forming SMC2 by replacing quartz M32 in whole or in part with cristobalite M72T provides the same end product.

Step 3. Weight Composition of SMC2 Before Firing

Table 10 shows the % weight of the starting materials used to form SMC2.

During the firing process the composition changes due to the processing conditions, i.e. chemical and structural changes occur during heating.

TABLE 10

| The starting materials used to form SMC2. | |
|---|---|
| Starting material | Weight % |
| Quartz (M32) | 37 |
| Dolomite (D-120) | 59 |
| Sodium Feldspar (MAXUM ® 1005-K) | 4 |

Sodium feldspar MAXUM® 1005-K is now named Sodium Feldspar 1005.

With reference to Table 10, example 2 requires dolomite D-120 and quartz M32 to be the main component of SMC2 at 59 weight % and 37 weight % respectively. The composition also includes sodium feldspar (MAXUM® 1005-K (now named Sodium Feldspar 1005)) at 4 weight %.

Step 4. Preparation and Mixing of the Starting Materials

The starting materials (described in step 3) were weighed on an ORMA Technology Balance. Quartz M32 (166.5 g), sodium feldspar (MAXUM® 1005-K (now named Sodium Feldspar 1005)) (18 g) and dolomite D-120 (265.5 g) were weighed out and put inside an alumina jar. The capacity of the alumina jar was 1 litre.

Alumina balls with a diameter of 20-25 mm (450 g) and water (400 g) were added to the alumina jar in addition to the starting materials respectively as a grinding corpse and grinding vehicle.

The alumina jar and its contents were placed inside a Nannetti S.r.l. Laboratory SPEEDY discontinuous fast mill for 60 minutes.

The density of the slurry formed in the alumina jar was determined on a pycnometer (known volume of 100 ml and weight of 200 g). The density of the particles was determined to be approximately 1550 g $dm^{-3}$.

The milling product was then dried in a Nannetti Fast Dryer at 110° C. for 12 hours. A powder was formed.

The powder was subsequently pulverised using an alumina mortar and pestle. The powder was then sieved using a sieve with a 1 mm mesh.

The conditions required to form the powder were set for a laboratory experiment. In other examples, the conditions may change for an industrial scale method.

Step 5. Calcination

Calcination of SMC2 was conducted on a Nannetti Kiln. This kiln was able to reach temperatures of up to 1400° C., if required.

In example 2, calcination was conducted at a maximum temperature of 1270° C. in the Nannetti Kiln.

The powder from step 4 was placed in the kiln in an alumina crucible. The crucible's dimensions were 12 cm in diameter, 9 cm in height and 1 cm in thickness.

In this non-limiting example, 50 grams of the powder from step 4 was calcined to form SMC2.

In this non-limiting example, the crucible was filled with the milling product and placed inside the chamber of the Nannetti Kiln. The temperature was increased 10° C. every minute until a maximum temperature of 1270° C. was reached. This maximum temperature of the kiln was maintained for a period of 60 minutes.

At the end of the 60 minutes, the crucible and its contents (i.e. SMC2) were removed from the kiln and permitted to cool to room temperature.

The conditions required to form SMC2 in the kiln were set for a laboratory experiment. In other examples, the calcination conditions may change for an industrial scale method.

Step 6. SMC2 Characterisation

SMC2 was then characterised. Additionally, the colorimetric properties of SMC2 were determined.

The chemical composition of SMC2 before and after calcination was determined by XRF analysis. The results are shown in Table 11.

TABLE 11

| The chemical composition of SMC2 before and after calcination. | | | |
|---|---|---|---|
| Chemical composition before calcination | | Chemical composition after calcination | |
| Chemical | Weight % | Chemical | Weight % |
| $SiO_2$ | 39.58 | $SiO_2$ | 54.83 |
| $Al_2O_3$ | 1.08 | $Al_2O_3$ | 1.49 |
| $TiO_2$ | 0.02 | $TiO_2$ | 0.02 |
| $Fe_2O_3$ | 0.04 | $Fe_2O_3$ | 0.06 |
| CaO | 18.01 | CaO | 24.96 |
| MgO | 12.95 | MgO | 17.94 |
| $Na_2O$ | 0.42 | $Na_2O$ | 0.58 |
| $K_2O$ | 0.09 | $K_2O$ | 0.12 |
| Loss on ignition: mainly carbon dioxide lost during calcination | 27.81 | Loss on ignition of the final product | 0 |

With reference to Table 11, the most common chemical in SMC2 before and after calcination is $SiO_2$.

The mineral composition of SMC2 after calcination was determined by XRD analysis and is shown in Table 12.

TABLE 12

| The mineralogy of SMC2 after calcination. | |
|---|---|
| Mineral | Weight % |
| Quartz | 0.8 |
| Cristobalite | 0.1 |
| Wollastonite | 0.0 |
| Pseudowollastonite | 0.0 |
| Diopside | 91.4 |
| Plagioclase (Anorthite) | 0.0 |
| Periclase | 0.0 |
| Melilite | 2.2 |
| Monticellite | 0.0 |
| Merwinite | 0.0 |
| Grossite | 0.0 |
| Spinel | 0.0 |
| Amorphous glass | 5.5 |
| Other minerals and unavoidable impurities | 0.0 |

With reference to Table 12, the most common mineral in SMC2 is diopside.

The colorimetric properties of SMC2 were measured. The results are shown in Tables 13 and 18. Table 18 compares the colorimetric parameters of SMC2 with the colorimetric parameters of cristobalite powder SIBELITE® M3000, both in "loose" flour form (not in resin). Table 13 compares the colorimetric parameters of SMC2 with the colorimetric parameters of cristobalite powder SIBELITE® M3000, both in the same proportional amount of 2k epoxy resin.

The parameters in Table 13 and Table 18 are defined by CIELAB. The parameter "b" is important when assessing colour. The higher the parameter "b" is, the more yellow the material is; this is important when considering the whiteness of a material because the human eye is more sensitive to this colorimetric parameter than others (i.e. blue, red, green, white or black). To determine the colour of SMC2, colour-colorimetric and spherical coordinates were used with a set light of D65/10°.

Where the results were measured in resin (i.e. Table 13), for each sample, 12 g of mineral powder and 8 g of epoxy resin (Fugante™ Epoxy 2k) were placed into a beaker. The mixture (in each case) was then homogenously mixed with a Speed Mixer by HausChild for 60 seconds, at a speed of 3000 rpm. The mixture (in each case) was then poured into an alumina cup and left for 34 hours at 35° C. to harden. Once 24 hours had passed, the colorimetrical parameters were measured.

TABLE 13

Colorimetric parameters of SMC2 (in flour form, because it had a particle size distribution with a maximum particle size of 45 μm; in epoxy resin) compared to cristobalite powder SIBELITE ® M3000 (in epoxy resin).

| Parameter | SMC2 | Cristobalite flour M3000 |
|---|---|---|
| L | 92.7 | 90 |
| a | −0.2 | −0.6 |
| b | 3.4 | 1.0 |

With reference to Table 13, SMC2 has comparable colorimetric properties when compared to cristobalite powder, when formulated with epoxy resin. Furthermore, quartz and cristobalite are present in very small amounts (see Table 12). Therefore, SMC2 minimises carcinogenic activity (by minimising the presence of quartz and cristobalite) whilst at the same time giving similar or better colorimetric properties than cristobalite powder.

In these non-limiting examples, the resin combined with the mineral filler is Fugante™ Epoxy 2k, which is an epoxy resin. Alternatively, the resin can be other epoxy resins, or a polyester resin, or a polyurethane resin. Non-limiting examples of polyester resins include AROPOL™ LP 67400 (produced by INEOS™), orthophthalic resins (produced by Ashland™), dicyclopentadiene resins (produced by Ashland™), isophthalic resins (produced by Ashland™) and POLARIS (produced by Ashland™). Non-limiting examples of polyurethane resins include URETAN NR (produced by Cores™) or PUCORE NG (produced by Cores™). When forming a synthetic stone (for use in or as, for example, a kitchen countertop, facades, bathrooms or furniture) with mineral filler and resin, typically the amount of mineral filler is from 80 to 92 weight % and the amount of resin (optionally of the types listed previously) is from 8 to 20 weight %.

Step 7: Determination of the Purity of SMC2

As determined in the mineralogy analysis of SMC2, the most common mineral in SMC2 is diopside (see Table 12).

Previously, the purity of diopside in a synthetic mineral composition did not exceed 84%. However, the purity of diopside in SMC2 is 91.4%.

Natural diopside comprises iron at from 0.5 to 2.5 weight %, or higher. SMC2 comprises iron at 0.06 weight %. The lower iron content results in improved colorimetrical parameters, and an improved degree of whiteness.

Comparative Example 3: Analysing Naturally Occurring Processed Diopside

The following comparative example determines the mineral composition of processed samples of diopside.

The occurrence of a concentration of naturally occurring diopside in (mineable) veins, or masses (thousands of cubic meters close to surface) is extremely rare. Therefore, in this example, the assessment of natural occurring diopside is limited to the assessment of concentrates of processed rock, in which diopside is always associated with other minerals (for example wollastonite, talc, calcite or quartz).

In this comparative example, two processed samples of diopside were analysed: Diopside 2019 PROJ-010598 Canada, 1-123B, PR-018671-001 (sample 1) and Diopside 2004 TNC04-070, China DI/ZHA C040115 (sample 2).

Table 14 shows the chemical composition of the two processed diopside samples.

TABLE 14

The results from the chemical analysis and LOI of the two processed diopside samples (amounts in weight %).

| Chemical | Sample 1 | Sample 2 |
|---|---|---|
| $Fe_2O_3$ | 2.928 | 0.590 |
| $Al_2O_3$ | 1.039 | 1.310 |
| $TiO_2$ | 0.596 | 0.050 |
| $K_2O$ | 0.340 | 0.80 |
| CaO | 27.066 | 24.540 |
| MgO | 14.210 | 19.080 |
| $Na_2O$ | 0.319 | 0.370 |
| $SiO_2$ | 49.203 | 48.760 |
| BaO | 0.007 | Nil |
| SrO | 0.133 | Nil |
| $ZrO_2$ | 0.008 | Nil |
| $Cr_2O_3$ | 0.014 | Nil |
| LOI | 3.2 | 5.7 |

Additionally, as shown in Table 14, samples of processed diopside indicate that geochemically no diopside with $Fe_2O_3$ % below 0.5% or $Al_2O_3$ % <1% exist.

Table 15 shows the mineral composition of the two processed diopside samples.

TABLE 15

The results from the mineral analysis of the processed diopside sample 1.

| Mineral | Sample 1 |
|---|---|
| Quartz | 2.7 |
| Pseudowollastonite | 2.8 |
| Wollastonite | 3.3 |
| Diopside | 84.0 |
| Calcite | 7.2 |

As shown in Table 15, the most common mineral in the processed diopside sample 1 is diopside.

As shown in Table 15, processed samples of naturally occurring diopside do not have a chemical composition containing diopside at 100 weight %. The processed samples of diopside indicate that no pure diopside chemical composition exists (i.e. a chemical composition containing diopside at 100 weight %).

Colorimetric properties of the processed diopside samples were measured. The results are shown in Table 16.

TABLE 16

The colorimetric properties of the processed diopside samples (both in "loose" flour form, because they had a particle size distribution with a maximum particle size of 45 μm).

| Parameter | Sample 1 | Sample 2 |
|---|---|---|
| L | 80.00 | 94.6 |
| a | −0.33 | 0.00 |
| b | 4.36 | 8.00 |

Sample 1 and Sample 2 of naturally occurring diopside are both substantially more yellow than SMC1 and SMC2 (described above).

From the two processed samples of naturally occurring diopside, it was possible to determine a theoretical mineral composition of naturally occurring diopside. Table 17 shows the theoretical mineral composition of naturally occurring diopside.

TABLE 17

The theoretical mineral composition of naturally occurring diopside.

| Mineral | Theoretical naturally occurring diopside |
|---|---|
| $Fe_2O_3$ | Nil |
| $Al_2O_3$ | Nil |
| $TiO_2$ | Nil |
| $K_2O$ | Nil |
| CaO | 25.90 |
| MgO | 18.61 |
| $Na_2O$ | Nil |
| $SiO_2$ | 55.49 |
| BaO | Nil |
| SrO | Nil |
| $ZrO_2$ | Nil |
| $Cr_2O_3$ | Nil |

As shown in Table 17, the theoretical naturally occurring diopside contains $SiO_2$, CaO and MgO. The mineral compositions of SMC1 and SMC2 also contain $SiO_2$, CaO and MgO in large percentage quantities.

Example 4: Use of Synthetic Mineral Composition 2 (SMC2) in Paint

The following non-limiting examples examine the substitution of SIBELITE® M3000 or PORTAFILL® H5 with SMC2 in paint compositions. SIBELITE® M3000 or PORTAFILL® H5 are products of Sibelco®.

In this example, SMC2 is used as a filler in a wall paint formulation. SMC2 can act as a paint brightener and matting agent due to its whiteness and porosity. SMC2 can act as a replacement for titanium dioxide in paint because of its whiteness and degree of porosity. SMC2 can therefore be present at low as well as high pigment volume concentrations (PVC) in the example paint compositions.

Table 18 compares the properties of SMC2 (in flour form because it has a particle size distribution with a maximum particle size of 45 μm) with SIBELITE® M3000 and PORTAFILL® H5.

TABLE 18

Comparison of SMC2 with SIBELITE ® M3000 and PORTAFILL ® H5.

| Parameter | SMC2 | SIBELITE ® M3000 | PORTAFILL ® H5 |
|---|---|---|---|
| Density (g/L) | 3.1 | 2.3 | 2.7 |
| D50 (μm) SediGraph | 11.2 | 11.5 | 0.5 |
| D50 (um) Laser diffraction | 11.4 | 12.2 | 3.0 |
| Mohs hardness | 6 | 6.5 | 2-3 |
| pH (10% slurry) | 9.4 | 9.0 | 10.0 |
| Oil absorption | 16 | 24 | 57 |
| CIE L*a* b* | L* 97<br>a* −0.0<br>b* 0.4 | L* 98.4<br>a* −0.6<br>b*1.0 | L* 98.0<br>a* 0.04<br>b* 1.0 |
| Refractive index | 1.67 | 1.48 | 1.61-1.64 |
| Specific surface area (BET) $m^2/g$ | 1.19 | 1.51 | 18 |

SMC1 is also suitable for use in paint compositions because SMC1 has beneficial L* and b* values (see Table 7).

Table 19 shows the mercury intrusion porosimetry of SMC2 (in flour form because it has a particle size distribution with a maximum particle size of 45 μm), PORTAFILL® H5 and SIBELITE® M3000.

TABLE 19

The porosity structure of SMC2, PORTAFILL ® H5 and SIBELITE ® M3000.

| Parameter | SMC2 | SIBELITE ® M3000 | PORTAFILL ® H5 |
|---|---|---|---|
| Pore volume $cm^3/g$ | 0.36 | 0.52 | 1.44 |
| Average pore diameter (μm) | 0.96 | 0.54 | 0.23 |

Table 19 shows that SMC2 (in flour form) has a similar porosity to SIBELITE® M3000, whilst the porosity of both SMC2 and SIBELITE® M3000 is less than PORTAFILL® H5.

Tables 20 to 23 show compositions of paint, with SIBELITE® M3000 and PORTAFILL® H5 substituted with SMC2 (in flour form). In each composition, the volumes are expressed as wet volume %. Furthermore, the substitution of SMC2 with the corresponding minerals is based upon the equivalent volume, and not on mass.

Tables 20 and 21 are paint compositions with a PVC (pigment volume concentration) of 50%.

The paint composition of Table 20 was prepared as follows: 102.5 g of demineralized water, 5.0 g of BYK 154, 1.5 g of Acticide MBS, 1.0 g of BYK 037 and 2.0 g of Tylose H6000 were mixed and stirred at a speed of 500 rpm. Then, 70.0 g of Kronos 2300, 106.0 g of SIBELITE® M3000 and 35.0 g of FinnTalc were added to the mixture which was stirred at a speed between 1000 and 3000 rpm. Then the mixture was agitated for 30 minutes. After 30 minutes, 160.0 g of Acronal S790 and 1.8 g of Aquaflow NLS-205 were added sequentially into the stirring mixture which was agitated for an additional 30 minutes. The paint composition was subsequently let to stand for 24 hours and deaerated before its properties were tested.

The paint composition of Table 21 was prepared in a similar way to the one of Table 20 except that 140.0 g of SMC2, instead of 106.0 g of SIBELITE® M3000, was added in the pigment/filler mixture.

The contrast ratio measurements were carried out according to DIN 53778, part 3. To determine the contrast ratio, the paints were generally applied with a 4-sided applicator at the wet thickness of 150 μm, 200 μm or 300 μm on a black and white contrast card. After drying for 24 hours, the value of whiteness Y was measured above the white (Yw) and the black background (Yb) using a spectrophotometer (see the equation below). The contrast ratio (CR) was then calculated according to the following equation:

$$CR=(Yb/Yw)*100.$$

Similarly, the ISO brightness was determined and the L, R457 and the yellowness values on the white background were recorded.

TABLE 20

Composition of paint that includes SIBELITE ® M3000.

| Component | Component description | Wet volume % |
|---|---|---|
| Water | Demineralized water | 29.94 |
| BYK 154 | Ammonium polyacrylate-based dispersing additive | 1.26 |
| Acticide MBS | Formaldehyde-free biocide | 0.43 |
| BYK 037 | VOC-free, silicon-based defoamer | 0.29 |
| Tylose H 6000 | Cetyl hydroxyethyl cellulose thickener | 0.73 |
| Kronos 2300 | Titanium dioxide | 5.10 |
| Omyacarb 10-gu | Calcium Carbonate | 0.00 |
| Omyacarb 2 | Calcium Carbonate | 0.00 |
| SIBELITE ® M3000 | Cristobalite | 13.18 |
| FinnTalc M20 | Talc | 3.64 |
| Acronal S790 | Styrene acrylic binder | 44.94 |
| Aquaflow NLS-205 | Nonionic synthetic associative thickener | 0.49 |

TABLE 21

Composition of paint that includes SMC2, instead of SIBELITE ® M3000.

| Component | Component description | Wet volume % |
|---|---|---|
| Water | Demineralized water | 29.99 |
| BYK 154 | Ammonium polyacrylate-based dispersing additive | 1.26 |
| Acticide MBS | Formaldehyde-free biocide | 0.43 |
| BYK 037 | VOC-free, silicon-based defoamer | 0.29 |
| Tylose H 6000 | Cetyl hydroxyethyl cellulose thickener | 0.73 |
| Kronos 2300 | Titanium dioxide | 5.10 |
| Omyacarb 10-gu | Calcium Carbonate | 0.00 |
| Omyacarb 2 | Calcium Carbonate | 0.00 |
| Diopside | SMC2 | 13.04 |
| FinnTalc M20 | Talc | 3.66 |
| Acronal S790 | Styrene acrylic binder | 45.01 |
| Water | Water | 0.00 |
| Aquaflow NLS-205 | Nonionic synthetic associative thickener | 0.49 |

(The components listed in Tables 20 and 21 were sourced from the following companies: BYK 154 and BYK 037 from BYK-Chemie GmbH; Acticide MBS from Thor Group Limited; Tylose H 6000 from SE Tylose GmbH; Kronos 2300 from Kronos International; Omyacarb 10-gu and Omyacarb 2 from Omya AG; SIBELITE® M3000 from Sibelco®; FinnTalc M20 from Elementis; Acronal S790 and Aquaflow NLS-205 from BASF SE).

As shown in Tables 20 and 21, replacing SIBELITE® M3000 with SMC2 in the paint composition removes the need to include cristobalite in the paint composition. SMC1 is expected to provide similar results to SMC2 because SMC1 has similar, beneficial L* and b* values (see Table 7).

As shown in Table 12, SMC2 has a high weight % of diopside. Diopside has a higher refractive index compared to cristobalite. Therefore, advantageously, replacing SIBELITE® M3000 with SMC2 results in a paint composition having a lower yellowness (as shown in Table 22).

TABLE 22

Properties of coating compositions that include SMC2 and SIBELITE ® M3000. 50% PVC (pigment volume concentrations) Paint evaluation

| | | | SIBELITE ® M3000 Based (From Table 20) | SMC2 Based (From Table 21) |
|---|---|---|---|---|
| pH of paint composition | | | 8.0 | 9.4 |
| Brightness L value (300 μm wet) on white | | | 96.66 | 96.63 |
| R457 value (300 μm wet) on white | | | 89.59 | 89.77 |
| Yellowness value (300 μm wet) on white | | | 3.30 | 2.96 |
| Contrast Ratio (150 μm wet) | Lb/Lw | % | 98.2 | 98.0 |
| Contrast Ratio (200 μm wet) | Lb/Lw | % | 98.9 | 98.9 |
| Contrast Ratio (300 μm wet) | Lb/Lw | % | 99.6 | 99.5 |
| Contrast Ratio (150 μm wet) | Yb/Yw | % | 95.4 | 95.1 |
| Contrast Ratio (200 μm wet) | Yb/Yw | % | 97.2 | 97.0 |
| Contrast Ratio (300 μm wet) | Yb/Yw | % | 99.0 | 98.7 |
| Scrub resistance class according to ISO EN 13300 | | | 1 | 2 |
| Gloss 85° (bird applicator 300 μm) | | % | 1.3 | 1.2 |
| Crack formation starting at | | mm | 3.0 | 3.0 |

Tables 23 and 24 are paint compositions with a PVC (pigment volume concentrations) of 45%.

The paint composition of Table 23 was prepared as follows. 96.0 g of demineralized water, 5.0 g of BYK 154, 1.5 g of Acticide MBS, 1.0 g of BYK 037, 2.0 g of Tylose H6000 and 2.5 g of Natrosol 330 plus were mixed and stirred at a speed of 500 rpm. Then, 75.0 g of Kronos 2300, 32.5 g of Omyacarb 10-gu, 32.5 g of Omyacarb 5-gu 25.0 g of PORTAFILL® H5 and 35.0 g of FinnTalc were added in the mixture which was stirred at a speed between 1000 and 3000 rpm. Then the stirring speed was increased to about 3000 rpm for 30 minutes. Then 160.0 g of Acronal S589, 20.0 g of demineralized water and 1.8 g of Aquaflow NLS-205 were added sequentially in the stirring mixture which was agitated for additional 30 minutes. The paint composition was subsequently let to stand for 24 hours and deaerated before testing its properties.

The paint composition of Table 24 was prepared similarly to the one of Table 23 except that 30.0 g of SMC2, instead of 25.0 g of PORTAFILL® H5, was added in the pigment/filler mixture.

TABLE 23

Composition of paint that includes PORTAFILL ® H5.

| Component | Component description | Wet volume % |
|---|---|---|
| Water | Water | 13.81 |
| BYK 154 | Ammonium polyacrylate-based dispersing additive | 1.32 |
| Acticide MBS | Formaldehyde-free biocide | 0.45 |
| BYK 037 | VOC-free, silicon-based defoamer | 0.31 |
| Natrosol 330 plus | Cetyl hydroxyethyl cellulose thickener | 0.59 |
| Kronos 2300 | Titanium dioxide | 5.74 |
| Omyacarb 10-gu | Calcium Carbonate | 3.69 |
| Omyacarb 5-gu | Calcium Carbonate | 3.69 |

TABLE 23-continued

Composition of paint that includes PORTAFILL ® H5.

| Component | Component description | Wet volume % |
|---|---|---|
| PORTAFILL ® H5 | Huntite/hydromagnesite | 3.01 |
| FinnTalc M20 | Talc | 3.84 |
| Acronal S589 | Styrene acrylic binder | 47.69 |
| Water | Water | 15.35 |
| Aquaflow NLS-205 | Nonionic synthetic associative thickener | 0.51 |

TABLE 24

Composition of paint that includes SMC2, instead of PORTAFILL ® H5.

| Component | Component description | Wet volume % |
|---|---|---|
| Water | Water | 13.83 |
| BYK 154 | Ammonium polyacrylate-based dispersing additive | 1.32 |
| Acticide MBS | Formaldehyde-free biocide | 0.45 |
| BYK 037 | VOC-free, silicon-based defoamer | 0.31 |
| Natrosol 330 plus | Cetyl hydroxyethyl cellulose thickener | 0.59 |
| Kronos 2300 | Titanium dioxide | 5.74 |
| Omyacarb 10-gu | Calcium Carbonate | 3.69 |
| Omyacarb 5-gu | Calcium Carbonate | 3.70 |
| Diopside | SMC2 | 2.94 |
| FinnTalc M20 | Talc | 3.84 |
| Acronal S589 | Styrene acrylic binder | 47.73 |
| Water | Water | 15.35 |
| Aquaflow NLS-205 | Nonionic synthetic associative thickener | 0.51 |

(The components listed in Tables 20 and 21 were sourced from the following companies: BYK 154 and BYK 037 from BYK-Chemie GmbH; Acticide MBS from Thor Group Limited; Natrosol 330 plus from Ashland™; Kronos 2300 from Kronos International; Omyacarb 10-gu and Omyacarb 2 from Omya AG; PORTAFILL® H5 from Sibelco®; FinnTalc M20 from Elementis; Acronal S589 and Aquaflow NLS-205 from BASF SE).

As shown in Tables 23 and 24, replacing PORTAFILL® H5 with SMC2 in the paint composition removes the need to include huntite in the paint composition.

In a medium PVC composition, huntite will have a neutral role in the gloss development of wall paints. Therefore, advantageously, by replacing PORTAFILL® H5 with SMC2 this results in a paint composition having lower yellowness and enhanced matting appearance (as shown in Table 25).

TABLE 25

Properties of coating compositions that include SMC2 and PORTAFILL ® H5. 45% PVC (pigment volume concentrations) Paint evaluation

| | | | PORTAFILL ® H5 based (from Table 23) | SMC2 based (from Table 24) |
|---|---|---|---|---|
| pH of paint composition | | | 8.4 | 8.8 |
| Brightness L value (300 μm wet) on white substrate | | | 96.73 | 96.72 |
| R457 value (300 μm wet) on white substrate | | | 89.63 | 89.75 |
| Yellowness value (300 μm wet) on white substrate | | | 3.48 | 3.30 |
| Contrast Ratio (150 μm wet) | Lb/Lw | % | 98.5 | 98.3 |
| Contrast Ratio (200 μm wet) | Lb/Lw | % | 99.1 | 99.0 |
| Contrast Ratio (300 μm wet) | Lb/Lw | % | 99.7 | 99.6 |
| Contrast Ratio (150 μm wet) | Yb/Yw | % | 96.1 | 95.7 |
| Contrast Ratio (200 μm wet) | Yb/Yw | % | 97.7 | 97.3 |
| Contrast Ratio (300 μm wet) | Yb/Yw | % | 99.1 | 98.9 |
| Scrub resistance class according to ISO EN 13300 | | | 2 | 2 |
| Gloss 85° (bird applicator 300 μm) | | % | 6.4 | 3.1 |
| Crack formation starting at | | mm | 3.0 | 3.0 |

Example 5: Use of Synthetic Mineral Composition 2 (SMC2) in Ink

The following non-limiting example examines the inclusion of SMC2 in an ink composition.

Ink compositions usually must include particles with maximum dimensions no greater than 1 μm. Therefore, before inclusion in an ink composition, SMC2 was ground to ensure no SMC2 particles had maximum dimensions greater than 1 μm before inclusion in an ink composition.

TABLE 26

Composition of ink that includes SMC2

| Component | Component description | Weight % |
|---|---|---|
| DIA25 SunLit ™ Diamond | Ready-made ink | 96 |
| SMC2 | Synthetic diopside | 4 |

DIA25 SunLit™ Diamond is a ready-made ink, as sold by Sun Chemicals™.

The addition of 4% of SMC2 to DIA25 SunLit™ Diamond resulted in no loss of print quality. Therefore, SMC2 can be used as a filler in ink compositions. SMC1 is expected to give a similar result. The inclusion of SMC2 in ink compositions lowers the cost of the ink without negatively affecting the print quality.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A synthetic mineral composition, comprising:

97.5 weight % or more diopside; and the balance being other minerals and unavoidable impurities, wherein the synthetic mineral composition has a particle size distribution with a minimum particle size of 100 μm and a maximum particle size of 500 μm in the form of a grit and/or has a particle size distribution with a maximum particle size of 45 μm in the form of a flour.

2. The synthetic mineral composition of claim 1, wherein the composition comprises cristobalite, quartz, or cristobalite and quartz, at less than 3.0 weight %.

3. The synthetic mineral composition of claim 1, wherein the synthetic mineral composition is white or near white in color.

4. The synthetic mineral composition of claim 1, wherein the synthetic mineral composition comprises less than 0.5 weight % $Fe_2O_3$.

5. The synthetic mineral composition of claim 1, wherein the synthetic mineral composition comprises less than 5 weight % $Al_2O_3$.

6. A synthetic stone comprising the synthetic mineral composition of claim 1.

7. The synthetic stone of claim 6, wherein the synthetic stone is white or near white in color.

8. A paint composition, an ink composition, a filtration medium, a ceramic composition, a dental composition, a biomedical composition, an implant material, a fuel cell, or a nuclear waste immobilization composition, comprising the synthetic mineral composition of claim 1.

9. The synthetic mineral composition of claim 1, wherein the synthetic mineral composition has CIELAB colorimetric parameters of: from 92 to 100 (L); from −0.3 to +0.3 (a); and from +3.5 to +1.5 (b).

10. The synthetic stone of claim 6, wherein the synthetic stone further comprises a resin, and the synthetic stone comprises 80 to 92 weight % of the synthetic mineral composition and 8 to 20 weight % of the resin.

* * * * *